Jan. 7, 1969   G. R. ENGLUND ET AL   3,420,438
TENS TRANSFER ASSEMBLY
Original Filed March 14, 1962   Sheet 1 of 11

FIG. 1A

INVENTORS
GOSTA R. ENGLUND AND
MATS E. MATTSSON
by Mason, Kolehmainen, Rathburn and Wyss
ATTORNEYS

United States Patent Office 3,420,438
Patented Jan. 7, 1969

3,420,438
TENS TRANSFER ASSEMBLY
Gosta R. Englund, Stockholm, and Mats E. Mattsson, Sollentuna, Sweden, assignors to Svenska Dataregister AB, Stockholm, Sweden, a corporation of Sweden
Original application Mar. 14, 1962, Ser. No. 179,595, now Patent No. 3,263,915, dated Aug. 2, 1966. Divided and this application Mar. 23, 1966, Ser. No. 536,889
Claims priority, application Sweden, Mar. 17, 1961, 2,839/61
U.S. Cl. 235—137          5 Claims
Int. Cl. G06c 7/10; G06c 9/00; G06c 15/26

ABSTRACT OF THE DISCLOSURE

A tens transfer mechanism for an accounting machine includes a totalizer shaft and totalizer elements movable from a setting position coupled to setting slides to a transfer position in which each totalizer element is coupled to one of a pair of differential transfer levers provided for each order of the totalizer. A transfer indicating latch for each order which is movable with the totalizer elements is set in the setting position by the totalizer element in an adjacent order whenever a transfer is required, and this set transfer indicating latch latches the other differential transfer lever when the totalizer is moved to the transfer position so that operation of the pairs of differential levers results in movement of the levers coupled to the totalizer elements in only those orders in which the remaining differential levers have been latched by the transfer latches.

---

This invention relates to a totalizer or accumulator, and, more particularly, to a new and improved tens transfer assembly for use in mechanical totalizers or accumulators. This application is a division of pending application No. 179,595, filed Mar. 14, 1962, now Patent No. 3,263,915.

The operating speed of an accounting machine, such as a cash register, is limited when its operating components are actuated by resilient or spring means, which spring means are also subject to fatigue. This problem is aggravated when a large number of mechanisms, such as all of the tens transfer mechanisms in a large capacity storage section, are dependent on spring actuation. It would, therefore, be desirable to provide a tens transfer assembly that is positively actuated from the main shaft of the cash register so as to increase the operating speed of the machine. However, because of the large number of tens transfer means in a cash register or other accounting machines having a large storage capacity section or a large number of totalizers, it is also necessary to reduce the number of components in such a positively actuated tens transfer mechanism to as small a number as possible while preserving flexibility of design and operation.

Accordingly, one object of the present invention is to provide an accounting machine or cash register including a new and improved tens transfer or carry assembly.

Another object is to provide a positively actuated tens transfer means.

A further object is to provide a tens transfer assembly including a pair of selectively latched differential levers for effecting tens transfer or carry operations.

A further object is to provide a positively actuated tens transfer assembly operable at high speeds and requiring a minimum of parts.

In accordance with these and many other objects, an embodiment of the present invention comprises a totalizer or accumulator assembly having a shaft movable from one position in which the accumulator gears on the shaft are coupled to a differential means for value settings to a second position in which the elements are disengaged from the differential means and coupled to tens transfer means. The transfer assemblies for each order include a pair of differential levers actuated by the main drive, a first one of which is coupled to the accumulator element in the same order when the accumulator shaft is moved to the second position. The second one of the differential levers in a given order is held against movement by latch or indicating means set by the next lowest order totalizer element when a carry is required from the lower order to the given order. When the second one of the differential levers is latched against movement, the actuation of the pair of differential levers by the main drive causes the entry of an increment of value by the first lever.

Many other objects and embodiments of the present invention will become apparent from considering the following detailed description in conjunction with the drawings in which.

An accumulator or totalizer assembly 264 including a carry or tens transfer assembly embodying the present invention is shown in FIGS 1–11 of the drawings. This accumulator assembly is adapted for use in accounting machines or cash registers and can be used in the cash register shown and described in detail in the above-identified patent. To facilitate an understanding of the manner in which the accumulator assembly 264 is related to the cash register shown in the above-identified patent, reference numbers identical to those in the patent are used herein to designate identical parts.

The accumulator assembly 264 is operated by differential elements 1151 in a plurality of amount differential assemblies during listing operations to store items of information received from amount banks of keys. During reading operations, the accumulator assembly 264 supplies information through the amount differential assemblies to an indicating assembly and a printing assembly, and this information is subsequently returned to storage in the accumulating assembly 264. During resetting operations, the data stored in the accumulator assembly 264 is removed therefrom and transferred through the amount differential assemblies to the indicating assembly and the printing assembly. In the illustrated embodiment, the accumulator assembly 264 includes a customer number register 1430 (FIG. 1A), an account accumulator group 1431, a merchandise accumulator group 1432, a clerk accumulator group 1433, and an itemizing accumulator or itemizer 1434.

Figure 1A:
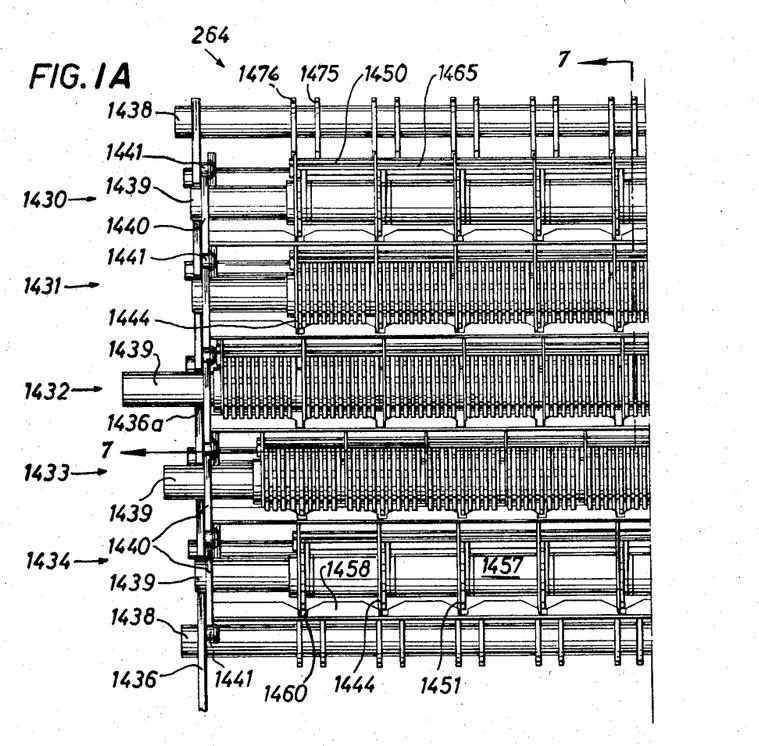
FIGURES 1A and 1B, when placed side-by-side, form a top plan view of an accumulator or totalizer assembly for an accounting machine or cash register.
Figure 1B:
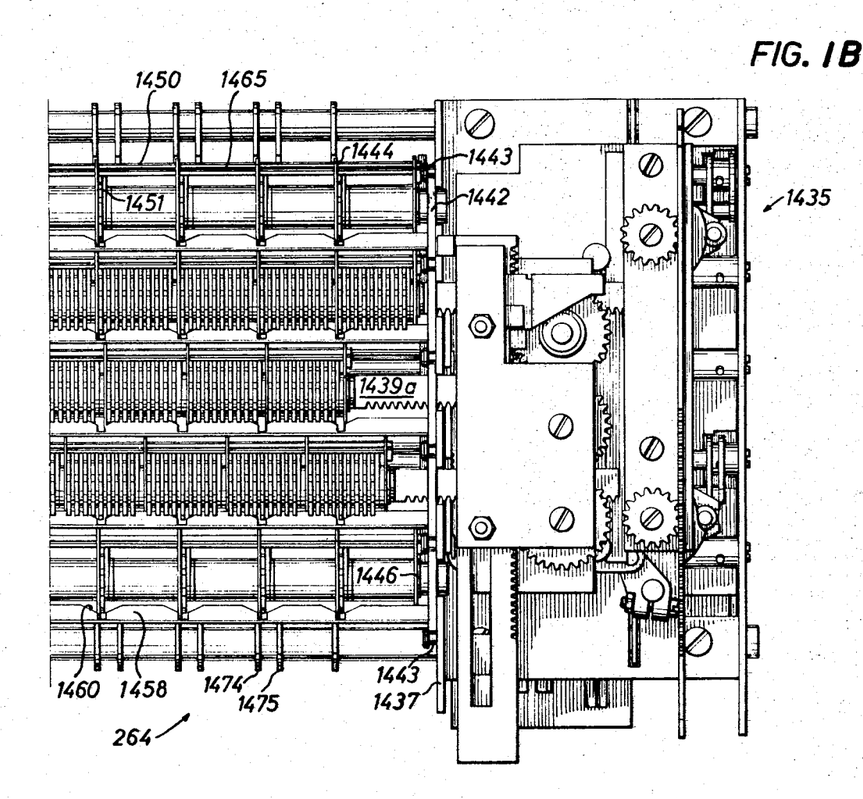

The operation of the accumulator assembly 264 is selectively controlled by the transaction banks of the keyboard assembly through an accumulator control unit or means 1435 (FIG. 1B). The accumulator control unit 1435 controls the times at which the plurality of accumulators 1430–1434 are moved into and out of engagement with toothed portions 1151b of the differential slides 1151 in the amount differential assemblies to control the performance of listing, reading or resetting operations. In addition, the control unit 1435 is controlled by an account keybank, a merchandise keybank, and a clerk keybank to select different ones of the plurality of accumulating means provided in each of the accumulator groups 1431–1433 for engagement with the differential slides 1151.

The accumulator groups 1430–1434 are mounted between a left frame element or wall 1436 and a right frame element or wall 1437 (FIG. 1) which are supported beneath the differential assemblies and between side walls of the main frame of the cash register. The side walls 1436 and 1437 are secured together in a spaced relation by a plurality of connecting shafts 1438. Each of the accumulator groups 1430–1434 includes a shaft 1439 carrying a number of groups of uniformly spaced accumulator gears or wheels that is equal to the number of individual accumulators provided in each accumulator group. The cash register is provided with nine amount differential assemblies, and each complete set of accumulator gears on the shafts 1439 thus includes nine individual accumulator gears each representing a separate denominational order. The accumulator groups 1430 and 1434 each includes only a single set of uniformly spaced accumulator gears so that the accumulator groups 1430 and 1434 each consists of only one accumulator or totalizer. On the other hand, the accumulator groups 1431–1433 each includes nine uniformly spaced sets of accumulator gears so that each of these accumulator groups includes nine separate accumulators (FIG. 1).

To provide means for moving the accumulator groups 1430–1434 into and out of driving engagement with the accumulator racks or slides 1151 in the amount differential assemblies, the left end of each of the shafts 1439 is carried on a member 1440 (FIGS. 1 and 2) that is slidably mounted on the wall 1436 by a plurality of headed fasteners or guide pins 1441. The right end of each of the shafts 1439 is carried by a member 1442 that is slidably mounted on the wall 1437 by a plurality of headed fasteners or guide pins 1443. The accumulator control unit 1435 selectively raises and lowers the individual pairs of slides or members 1440 and 1442 to move the accumulator groups 1430–1434 into and out of driving engagement with the accumulator racks 1151 in the amount differential assemblies at different times during the operating cycle of the register in accordance with whether listing, reading, or resetting operations are to be performed.

Since the accumulator groups 1431–1433 include more than one set of accumulator gears providing a plurality of individual accumulators within each of these groups, the shafts 1439 in the accumulator groups 1431–1433 are carried on the members 1440 and 1442 for axially directed sliding movement. The right end of each of these three shafts is provided with a toothed portion 1439a (FIG. 2) that is engaged and driven by the accumulator control unit 1435 to axially displace the shafts 1439 and the accumulator gears carried thereon to the position in which the proper set of accumulator gears is aligned with the accumulator racks 1151. In FIG. 1, the shaft 1439 in the merchandise accumulator group 1432 is shown in a normal position corresponding to a normal position of the merchandise differential assembly, and the shaft 1439 in the account accumulator group 1431 is shown shifted to an extreme right-hand position corresponding to the ninth position of the account differential assembly.

Figures 2, 3:
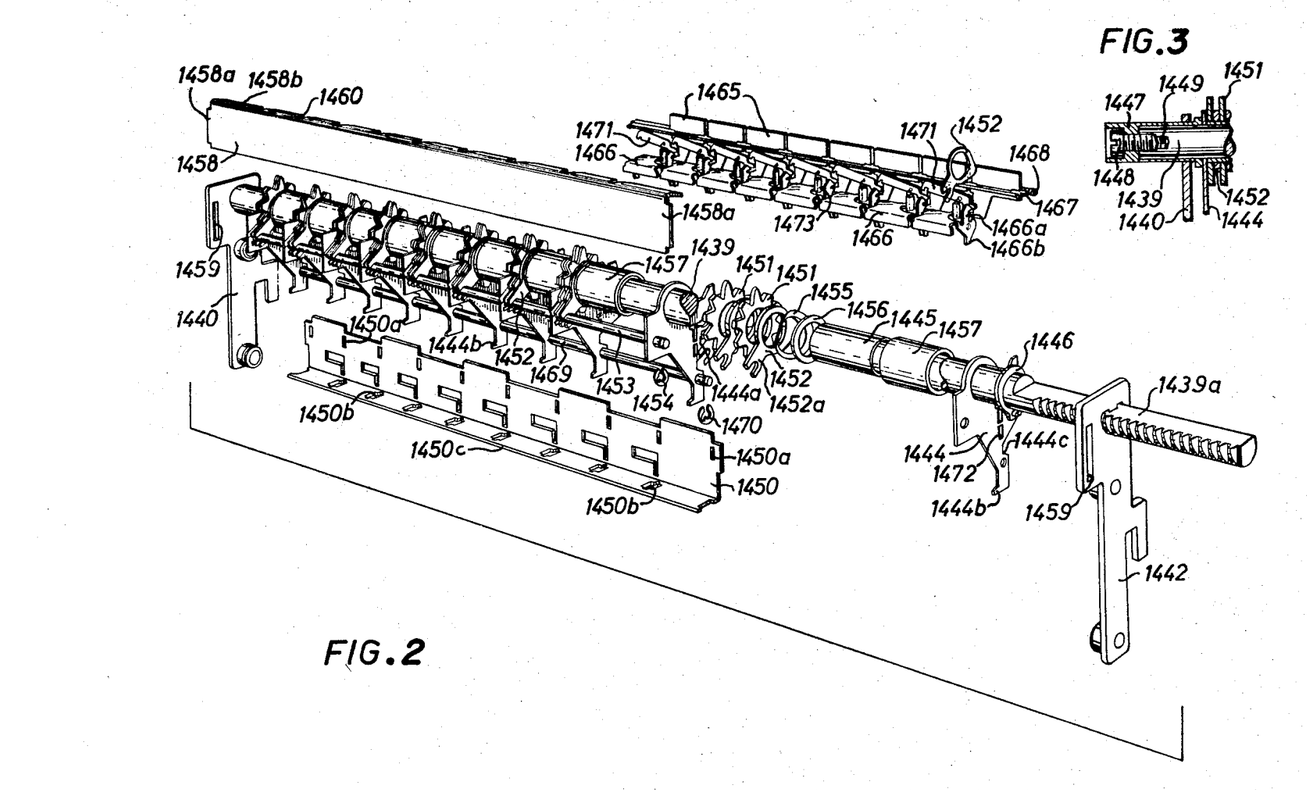
FIGURE 2 is an exploded perspective view of one accumulator group included in the accumulator assembly.
FIGURE 3 is an enlarged fragmentary sectional view of one end of an accumulator shaft forming a part of an accumulator group.

FIG. 2 illustrates a typical accumulator group or line having two sets of spaced accumulator gears providing two accumulators in the accumulator group and thus illustrates an accumulator capable of axial adjustment under the control of the accumulator control unit 1435. The illustrated accumulator line includes ten plates 1444 which are carried on the shaft 1439 and which are held in spaced positions thereon by nine bearing sleeves 1445 which are interposed between adjacent pairs of the plates 1444. The right-hand plate 1444 is disposed adjacent a washer 1446 that is carried in an annular groove on the shaft 1439, and a sleeve 1447 (FIG. 5) bears against the left-hand plate 1444. A machine screw 1448, which is threadably received within a tapped opening 1449 in the left end of the shaft 1439, provides means for forcing the plates 1444 and the tubular bearings or sleeves 1445 to the right toward the lock washer 1446 so that these elements are secured in a desired position on the shaft 1446. A frame element 1450 includes a plurality of aligned openings 1450a and 1450b in which projections 1444a (FIG. 7) and 1444b (FIG. 2) on the plates 1444 are inserted to provide additional means for securing the plates 1444 in spaced positions. Thus, the plates 1444 and the sleeve bearings 1445 divide the length of the shaft 1449 into nine separate sections for receiving nine different groups of accumulator gears or wheels corresponding to the nine orders of digital information that can be stored in the accumulating assembly 264.

Each of the decade or denominational divisions on the shaft 1439 is provided with a number of accumulator gears or wheels 1451 that is equal to the desired number of individual accumulators in the accumulator group or line. In the accumulator group shown in FIG. 2, two accumulator gears 1451 are mounted on the sleeve bearing 1445 between each set of plates 1444. The individual accumulator gears 1451 are spaced from each other and from the plates 1444 by interposed spacer elements 1452, each of which is provided with a bifurcated end portion 1452a in which is disposed a shaft 1453 that is carried on the plates 1444 and secured thereto by a pair of lock washers 1454. The engagement of the shaft or rod 1453 by the bifurcated portions 1452a of the spacers 1452 prevents rotation of these elements. A lock washer 1455 and a spacing washer 1456 are mounted on the bearing 1445 adjacent the right-hand spacer 1452. When the accumulator group includes a full complement of nine individual accumulators, the spacing washer 1456 bears against the right-hand plate 1444 in each of the nine divisions. Alternatively, and as indicated in FIG. 2, if the accumulator group includes less than nine accumulator gears 1451 in each decade, a spacing sleeve 1457 is mounted on the sleeve bearing 1445 interposed between the washer 1456 and the right-hand plate 1444 to hold the gears 1451 in a proper position on the shaft 1439.

To provide locking and aligning means for all of the accumulator gears 1451 except the set of gears moved into alignment with the accumulator racks 1151, a locking and aligning plate 1458 is provided. This plate includes two projecting portions 1458a at its opposite ends which are received within a pair of slots 1459 formed in the supporting members or slides 1440 and 1442. The upper edge of the plate 1459 is provided with a flanged portion 1458b that engages the teeth on the accumulator gears 1451 to prevent rotation thereof. The flanged portion 1458b is provided with nine spaced openings 1460 that are disposed beneath the nine accumulator racks 1151. Since the plate 1458 is carried on the members 1440 and 1442, this plate is not moved during axial movement of the shaft 1439, and a single gear in each of the nine groups of accumulator gears can be moved to a position aligned with the slot 1430 to permit its rotation by the engaged accumulator slide 1151.

Each of the accumulator groups 1430–1434 includes means for indicating a carry from one denominational order to the next highest denominational order when one of the accumulator gears 1451 driven by an accumulator rack 1151 advances beyond a "9" representing position. This carry indicating mechanism (FIGS. 2, 4 and 5) includes eight carry actuating arms 1465 that are each actuated by an elongated tooth 1451a on an accumulator gear 1450 in all but the highest denominational order to selectively operate one of eight carry indicating yokes 1466 disposed in all but the lowest denominational order. The yokes 1466, when set by the arms 1465, control means for entering an additional increment of value in the related denominational order.

Figure 4:
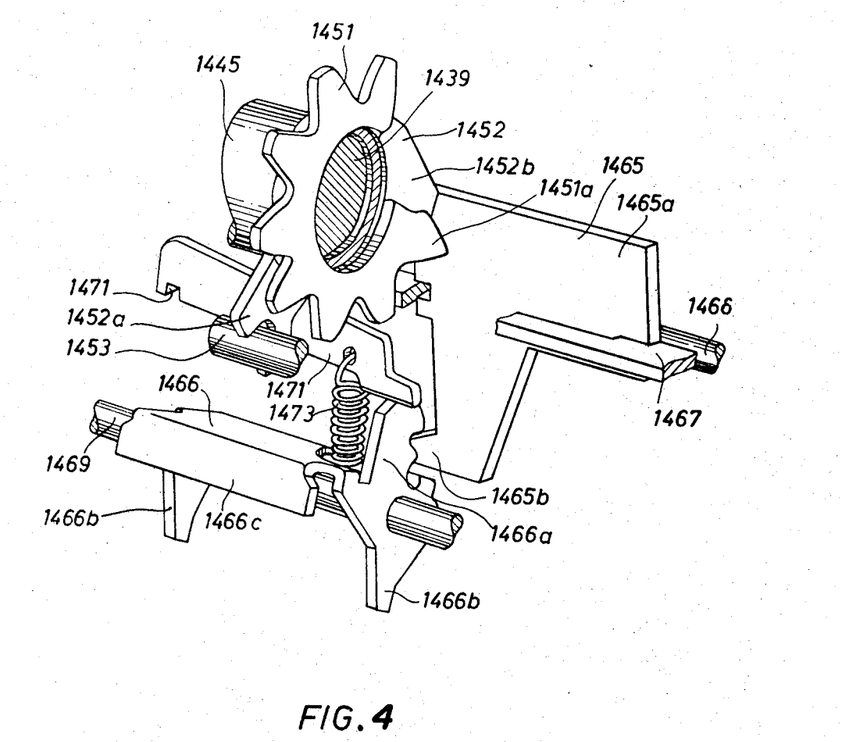
FIGURE 4 is an enlarged perspective view of a carry indicating means forming a part of a carry mechanism for an accumulator group, the carry indicating mechanism being shown in a normal position.

More specifically, the eight carry actuating arms 1465 are pivotally mounted on a recessed bar 1467 that is disposed within aligned slots in the plates 1444 and secured in the position thereon by a rod 1468. An upper portion 1465a of each carry actuating arm 1465 is disposed between the plates 1444 in one denominational order and normally rests against a projecting portion 1452b on the spacer 1452 (FIG. 4). When the engaged accumulator gear 1451 aligned with the recess 1460 is driven a sufficient distance in a counterclockwise direction, the enlarged tooth 1451a engages the upper portion 1465a of the arm 1465 and pivots this arm in a clockwise direction about the supporting bar 1467. A depending lower end portion 1465b of each of the arms 1465 extends to the left (FIG. 2) through a notch 1444c in the left-hand plate 1444 of the decade.

When the arm 1465 is tipped in a clockwise direction, the projecting portion 1465b engages an upwardly extending portion 1466a on the carry indicating yoke 1466 in the next highest denominational order. This pivots the yoke 1466 in a counterclockwise direction about a supporting shaft 1469 from the normal position shown in FIG. 4 to the set position shown in FIG. 5. The supporting shaft 1469 is carried on the plate 1444 and is secured against movement by a pair of lock washers 1470 (FIG. 2). Each of the carry indicating yokes 1466 is disposed between the plates 1444 of each denominational order except the lowest and includes two lower depending arms 1466b which are received within enlarged side portions of the slots 1450b in the supporting frame 1450. Thus, the carry indicating yoke 1466 is shifted from the normal position shown in FIG. 4 to the set position shown in FIG. 5 in response to the establishment of a carry condition when an engaged accumulator gear 1451 in the next lowest denominational order moves beyond a "9" representing position.

Figure 5:
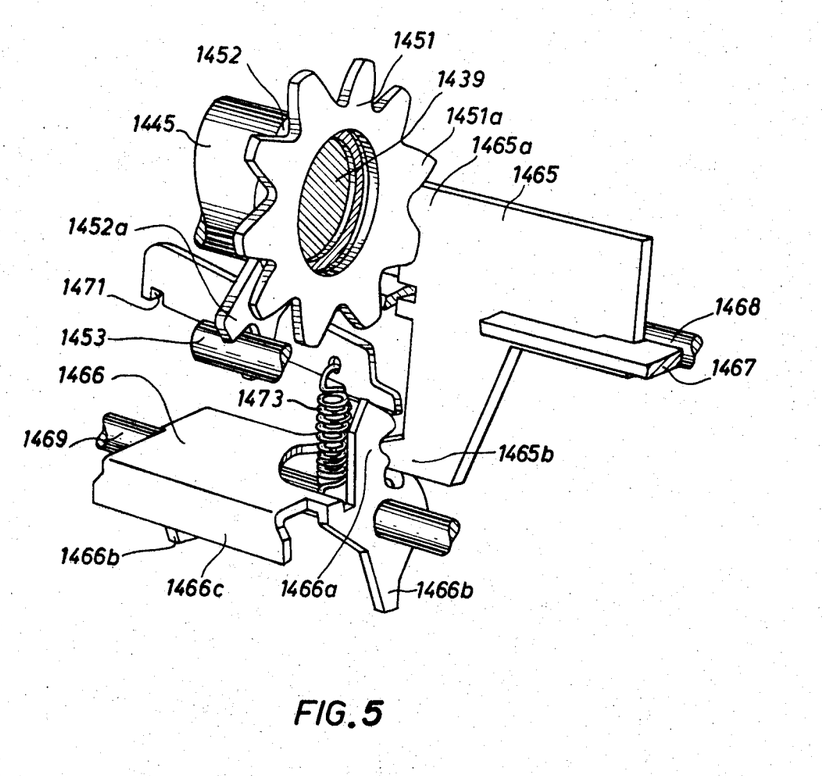
FIGURE 5 is a view similar to FIGURE 4 showing the carry indicating mechanism in an operated position.

Each of the carry indicating yokes 1466 is provided with a detent means for latching this yoke in a normal position or a set position. This detent means comprises a detent element 1471 that is pivotally mounted on the left-hand plate 1444 in each denominational group by a notch 1471a which is received within an opening 1472 in the plate 1444. A tension spring 1473 connected between the free end of the detent arm 1471 and the shaft 1469 resiliently biases the free end of the locking arm 1471 into engagement with the upper edge of the upwardly projecting portion 1466a on the yoke 1466. The upper end of the projecting portion 1466a is pointed to permit the locking arm 1471 to hold the yoke 1466 in two spaced positions.

All of the accumulator groups or lines 1431—1433 are similar to the accumulator group illustrated in FIGS. 2–5 except that nine sets of accumulator wheels or gears 1451 are provided in these accumulator groups. The accumulator groups 1430 and 1434 are of substantially the same construction as that illustrated in FIGS. 2–5 except that each of these accumulator groups comprises only a single accumulator and does not require means for adjusting the axial position of the shaft 1439 in order to render a selected one of the sets of accumulator gears 1451 effective to be driven by the related accumulator racks 1151. Thus, the shafts 1439 in the accumulator groups 1430 and 1434 do not include the threaded portion 1439a and terminate adjacent the support members 1442 without extending into the accumulator control unit 1435.

The carry mechanism is operated to concurrently perform carry and carry-on-carry operations under the control of the carry indicating means in like denominational orders of the accumulator groups 1430–1434 in ascending denominational order following the disengagement of the accumulator groups 1430–1434 from the differential assemblies. The carry mechanism comprises eight substantially identical units, each of which controls the carry in like denominational orders in all of the accumulator groups 1430–1434 in all but the lowest order of the accumulating assembly 264. Each of the carry mechanisms is mounted between a pair of supporting plates 1474 and 1475 (FIGS. 1 and 6) which are connected to the side walls 1436 and 1437 by the shafts or rods 1438 and which are maintained in spaced positions by spacing sleeves carried on the shafts 1438.

Figure 6:
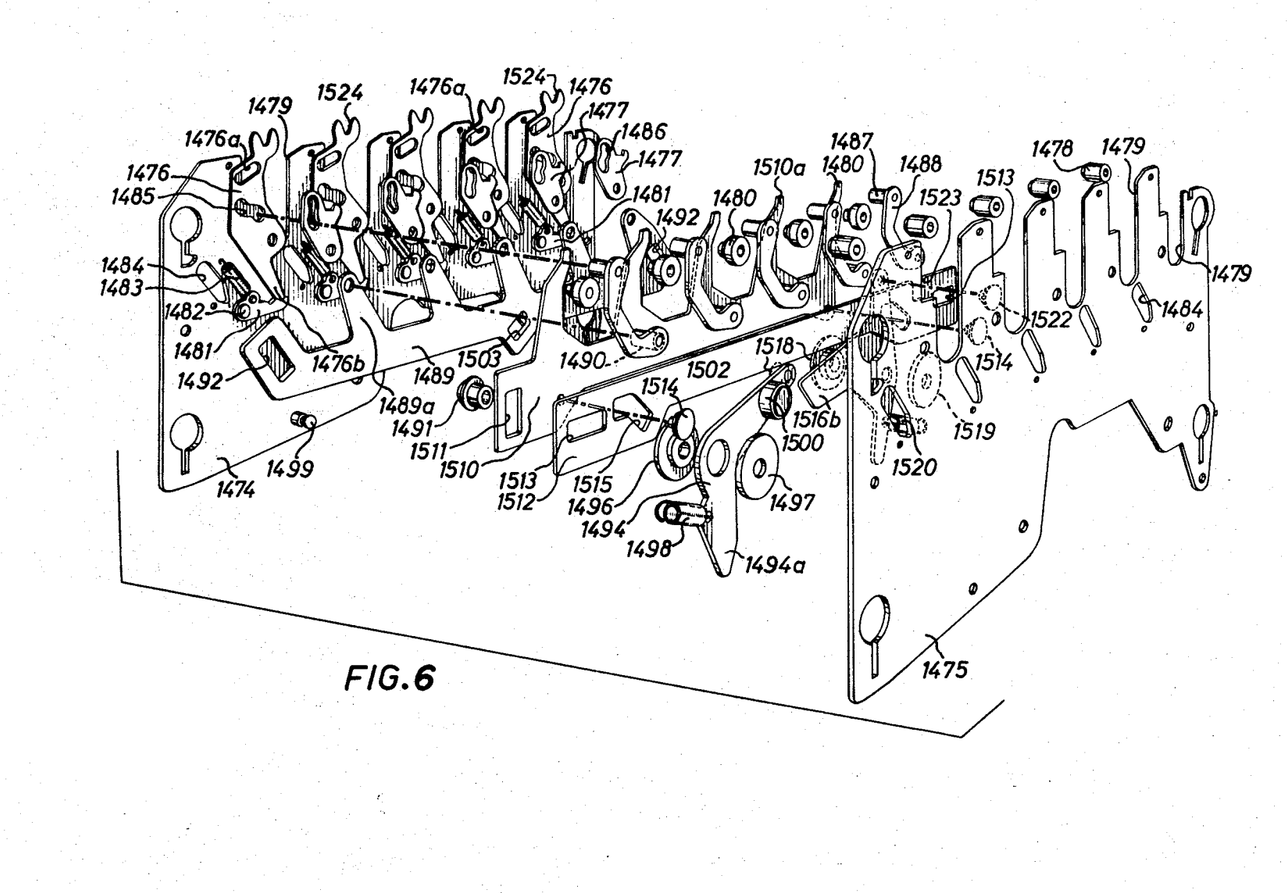
FIGURE 6 is an exploded perspective view of a carry mechanism for one order of the accumulator assembly.

FIG. 6 illustrates the carry operating mechanism for one decade or order of the accumulator groups 1430–1434. This carry mechanism includes five carry operating levers 1476 and five carry detecting levers 1477. Each pair of the levers 1476 and 1477 are pivotally mounted on the frame element 1474 by a pivot pin 1478 so as to be disposed immediately to the left of five pairs of aligned openings 1479 in the plates 1474 and 1475 which receive the accumulator groups 1430–1434. When viewed from left to right in FIG. 6, the left-hand lever 1476 controls the carry operation in the accumulator group 1434 and the right-hand lever 1476 controls the performance of a carry operation in the accumulator group 1430. A stud 1480 received within a slot 1476a in the upper end of each of the levers 1476 prevents tipping of these levers during their actuation. A lower end portion 1476b of each of the levers 1476 engages one of two surfaces on a detent 1481 which is pivotally mounted on the frame element 1474 by a shaft 1482. The detent 1481 is resiliently biased into engagement with the lever 1476 by a tension spring 1483. The tension spring 1483 is disposed within an opening 1484 in the frame elements 1474 and 1475 and is connected between the detent 1481 and the frame element 1474. Each of the detents 1481 is capable of latching the related lever 1476 in either a right-hand set position or a left-hand normal position (FIG. 6).

To provide means for actuating the five pairs of levers 1476 and 1477, these two levers are provided with a pair of cam slots 1485 and 1486, respectively, in which is received one end of a cam follower pin 1487 that is secured to the upper end of a link 1488. The lower ends of the five links 1488 are pivotally secured to five upwardly extending arms 1489a on a carry actuating slide 1489 by a plurality of pivot pins 1490. The slide 1489 is slidably mounted between the frame elements 1474 and 1475 by a pair of studs 1491 which are secured to the frame elements 1474 and 1475 and which extend through two inclined slots 1492 in the opposite ends of the slide 1489.

The carry actuating slide 1489 is operated by a cam 1493 (FIGS. 7–11) that is keyed to a main shaft 1073. A cam follower lever 1494 is pivotally mounted on the frame elements 1474 and 1475 by a shaft 1495 (FIG. 7), a shouldered spacing washer 1496 (FIG. 6) and an additional washer 1497. A tension spring 1498 secured between the cam follower lever 1494 and a pin 1499 carried on the frame element 1474 resiliently biases a roller 1500 on the lever 1494 into engagement with the outer periphery of the came 1493. A roller 1501 (FIG. 7) carried on the cam 1493 is adapted to be moved into engagement with a lower arm 1494a on the cam follower lever 1494 during the rotation of the cam 1493. The upper end of the cam follower lever 1494 carries a roller 1502 that is received within a slot 1503 in the lower edge of the slide 1498.

Each decade or order carry mechanism also includes a reset slide 1510 for resetting the indicating yokes 1466 from the set position shown in FIG. 5 to the normal position shown in FIG. 4 at the end of each cycle of operation of the cash register 250. The reset slide 1510 is slidably mounted between the frame elements 1474 and 1475 for vertical movement by the studs 1491 which pass through two vertically extending slots 1511 at opposite ends of the slide 1510. This slide also includes five upwardly extending arms 1510a that are normally disposed beneath a depending lip or flange 1466c (FIGS. 4, 5 and 7–11) on each of the yokes 1466. The slide 1510 is reciprocated vertically so that the upper ends of the arms 1510a engage the depending lips 1466c and pivot the carry indicating yokes 1466 in a clockwise direction about the shafts 1469 to restore these yokes from the set or carry indicating position shown in FIG. 5 to the normal position shown in FIG. 4. This upward movement of the resetting slide 1510 overcomes the spring 1473 to permit the latching arm 1471 to be displaced by the upper end of the projecting portion 1466a on each of these yokes.

To provide means for actuating the resetting slide 1510, an actuating slide 1512 is mounted between the frame members 1474 and 1475 and adjacent the right side of the resetting slide 1510 by the plurality of studs 1491 which extend through two horizontally elongated slots 1513 in the slide 1512. A pair of headed fasteners 1514 are secured to the resetting slide 1510 and are received within angularly formed cam slots 1515 in the actuating slide 1512. The slide 1512 is actuated by the cam 1493 by means of a cam follower lever 1516 that is pivotally mounted between the frame elements 1474 and 1475 by a shaft 1517 (FIG. 7), a shouldered washer 1518 (FIG. 6) and an additional washer 1519. A tension spring 1520 secured between a depending arm 1516a on the lever 1516 and a pin 1521 carried on the frame element 1474 (FIG. 7) resiliently biases the lever 1516 in a counterclockwise direction so that an arm 1516b normally engages the pin or roller 1501. A stud 1522 carried on the upper end of the lever 1516 is received within a recess 1523 in the upper edge of the actuating slide 1512.

Figure 7:
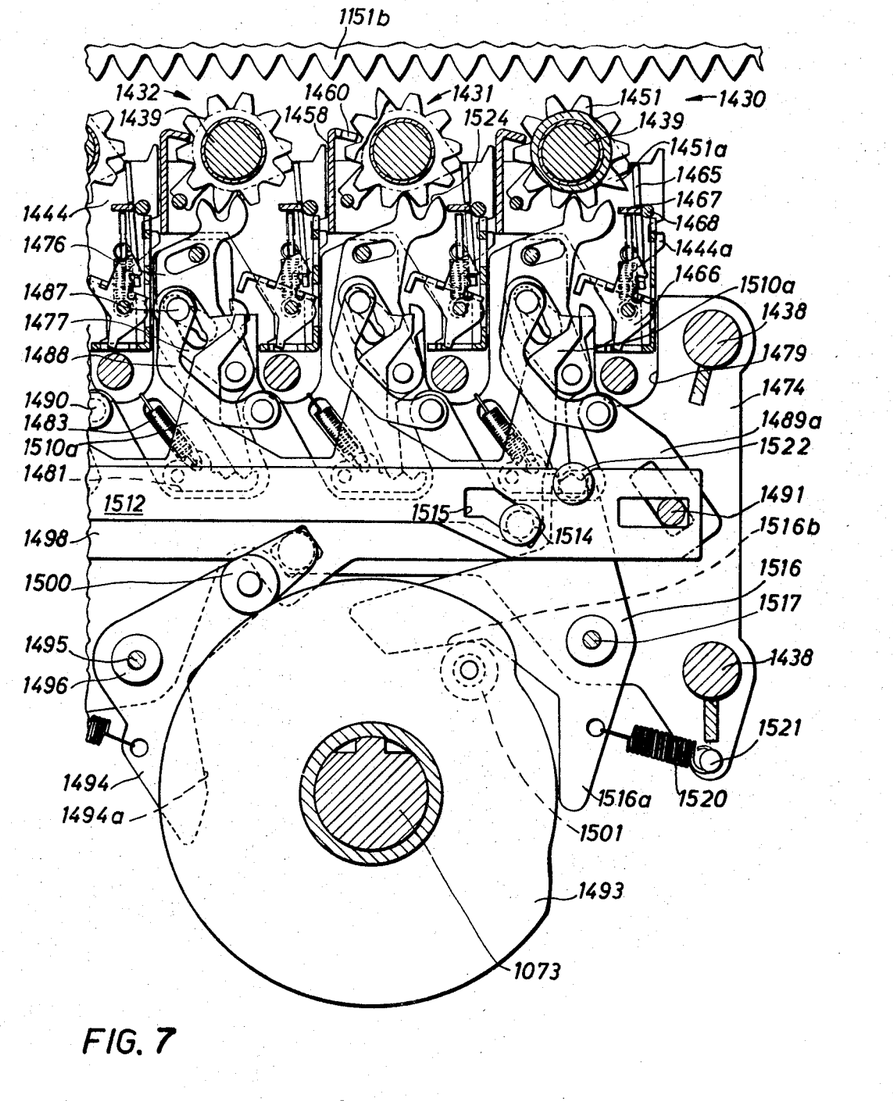
FIGURE 7 is an enlarged fragmentary sectional view showing the carry mechanism in a normal position.

FIGS. 7–11 of the drawings illustrate a typical operation of the carry mechanism provided in one order of the accumulator assembly 264. FIG. 7 of the drawings illustrates the carry mechanism in a normal position prior to the initiation of the cycle of operation of the cash register 250. In this position, all of the accumulator shafts 1439 are in their lower position in which one of the teeth on any accumulator gear 1451 aligned with the recess 1460 is disposed in a notch or recess 1524 in the upper end of each of the carry actuating levers 1476. In FIG. 7, the lever 1476 associated with the accumulator group 1432 is in its normal left-hand position. However, the levers 1476 associated with gears 1451 in the accumulator groups 1430 and 1431 are in their right-hand or set position indicating that a carry operation has been performed in these two accumulator groups during the preceding cycle of operation of the cash register 250.

Figure 8:
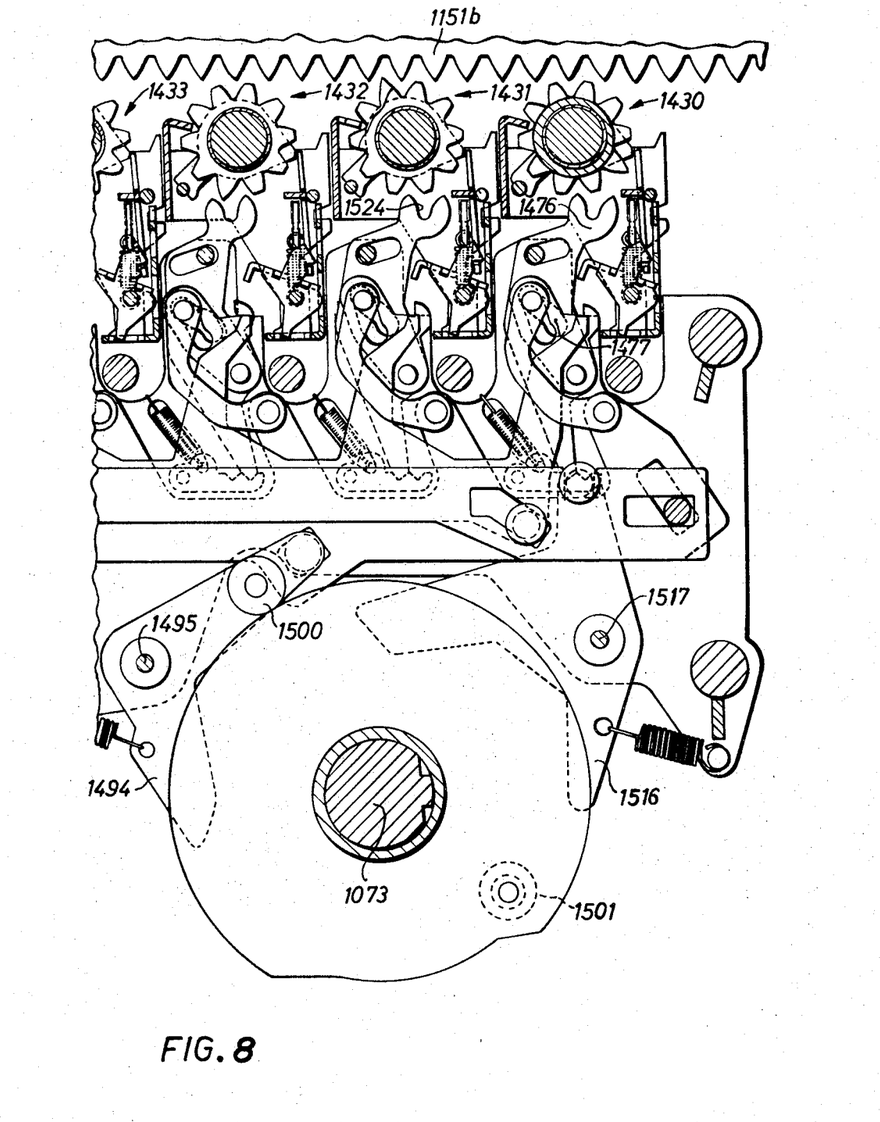
FIGURE 8 is a view similar to FIGURE 7 illustrating the carry mechanism following the initiation of a cycle of operation and in a condition in which the accumulator groups are disengaged from the carry mechanism.

Assuming that an item of information is to be listed in the single accumulator in the accumulator group 1430 and in a selected one of the nine accumulators in the accumulator group 1431, the initiation of a cycle of operation of the cash register operates the selector control unit 1435 so that all of the accumulator shafts 1439 are elevated to the intermediate position shown in FIG. 8, in which the accumulator gears 1451 are spaced above the upper ends of the levers 1476. During this portion of the cycle of operation of the cash register, the transaction differential assemblies are set so that the accumulator control unit 1435 is provided with information indicating the type of operation to be performed, i.e., listing, resetting or reading, and with additional information indicating that the accumulator groups 1430 and 1431 are to be engaged as well as the particular accumulator within the accumulator group 1431 that is to be engaged. The elevated position of the shafts 1439 permits the shaft 1439 in the accumulator group 1431 to be axially adjusted during the setting of the account differential assembly so that the proper set of accumulator gears in the group 1431 is disposed in alignment with the recesses 1460 and the toothed portions 1151b of the accumulator racks 1151 in the amount differential assemblies.

During the next following portion of the cycle of operation of the cash register 250, the selected accumulators in the selected groups 1430 and 1431 are elevated into engagement with the toothed portions 1151b of the differential racks 1151 in the amount differential assemblies 258 during either the setting or resetting movement of these differential assemblies in accordance with whether listing, reading, or resetting operations are to be performed. This causes the rotation of the engaged gears 1451 an amount proportional to the value of the entry. The rotation of the gear 1451 by the engaged toothed portion 1151b of the accumulator rack 1151 in the accumulator group 1430 moves the elongated tooth 1451a from the position shown in FIGS. 7 and 8 to the position shown in FIG. 9. This pivots the arm 1465 to produce a carry to the next highest order of the accumulator group 1430 from that shown in FIG. 9.

In the range between 206° and 261° of rotation of the main shaft 1073 and in dependence on the order of the carry mechanism involved, the lower arm 1494a of the cam follower lever 1494 is engaged by the roller 1501 (FIG. 9) and pivots the cam follower lever 1494 in a clockwise direction about the shaft 1495 to move the carry operating slide 1489 downwardly and to the right, as determined by the engagement of the slots 1492 with the studs 1491. This moves the plurality of links 1488 downwardly and forces the cam follower pins 1487 disposed in the slots 1485 and 1486 downwardly. This downward movement of the pins 1487 first pivots the detecting levers 1477 in a clockwise direction about the pins 1478. In the carry mechanisms associated with the accumulator groups 1430 and 1431, a projection 1477a on the carry detecting levers 1477 engages an edge 1450c of the supporting frame 1450 because the accumulator groups 1430 and 1431 are elevated for actuation by the differential assemblies and may require a carry operation to be performed. The blocking movement of the detecting levers 1477 in only these two accumulator groups continuing downward movement of the links 1488 and the pins 1487 to pivot the two levers 1476 in a counterclockwise direction about the pin 1478 so that these two levers are restored to their normal position shown in FIG. 9.

In the accumulator groups which are not elevated, the clockwise movement of the detecting levers 1477 is not blocked and those of the levers 1476 that are not in the normal position will not be reset to normal position but will remain in set position until a cycle of operation is initiated in which the related accumulator group is elevated into engagement with the amount differential assemblies. Thus, the clockwise movement of the cam follower lever 1494 resets all of the carry actuating levers 1476 associated with accumulator groups that are engaged with the differential assemblies 258. After 261° of rotation of the main shaft 1073, all of the levers 1476 to be reset in all of the orders of the accumulator assembly 264 have been reset, and the carry operating slides 1489 in all of the orders are in their lowermost positions. This sequential operation of the slides 1489 is produced by offsetting the normal positions of the control surfaces on the cams 1493 in a clockwise direction in ascending denominational orders.

Figure 9:
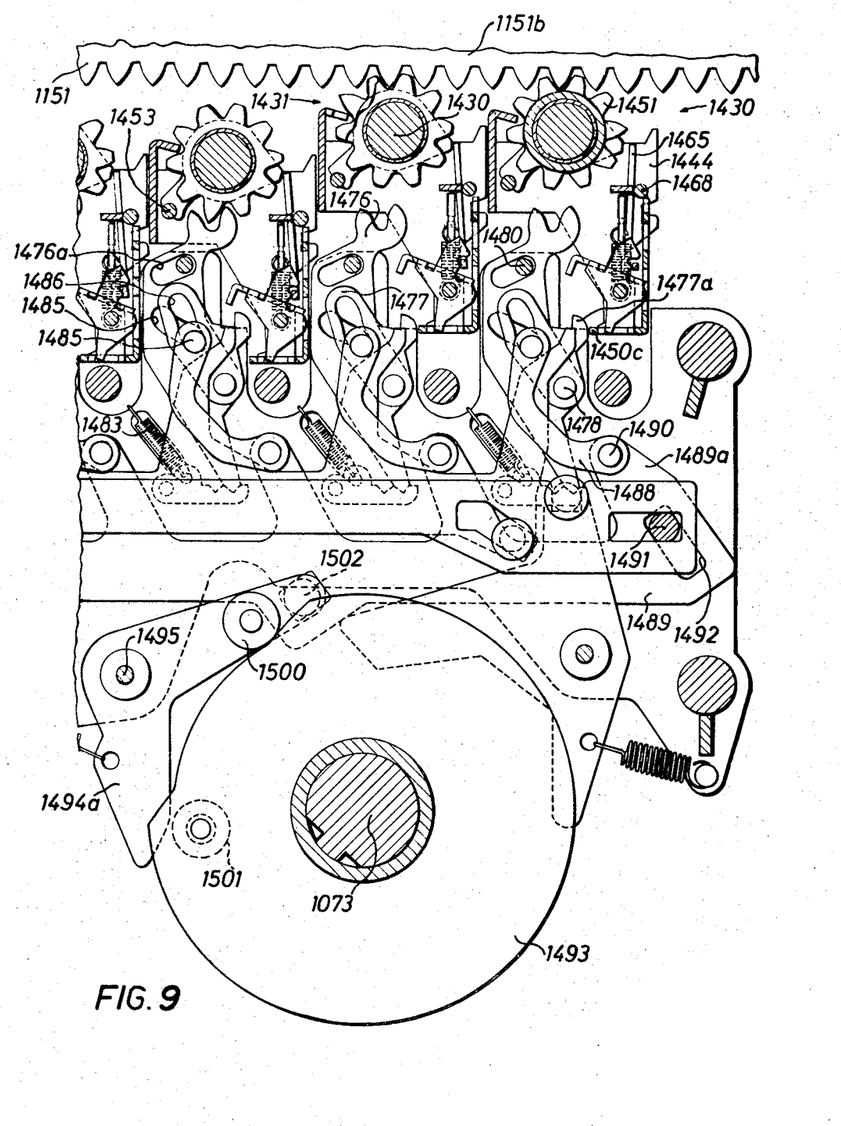
FIGURE 9 is a view similar to FIGURES 7 and 8 and illustrates the resetting of the carry mechanism to a normal condition during a subsequent portion of a cycle of operation of the cash register in which selected accumulator groups are engaged with a differential means.
Figure 10:
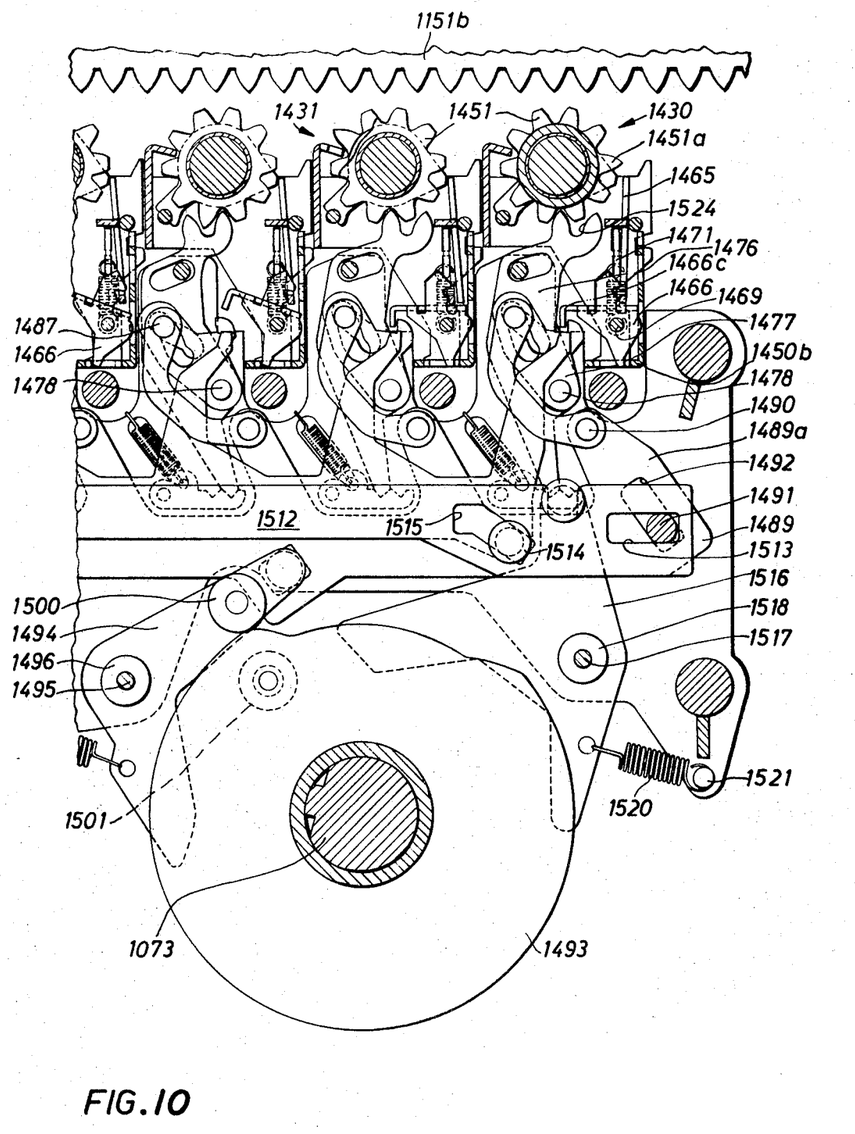
FIGURE 10 is a view similar to FIGURES 7–9 and illustrates the carry mechanism during a subsequent portion of an operating cycle in which a carry operation is being performed.
Figure 11:
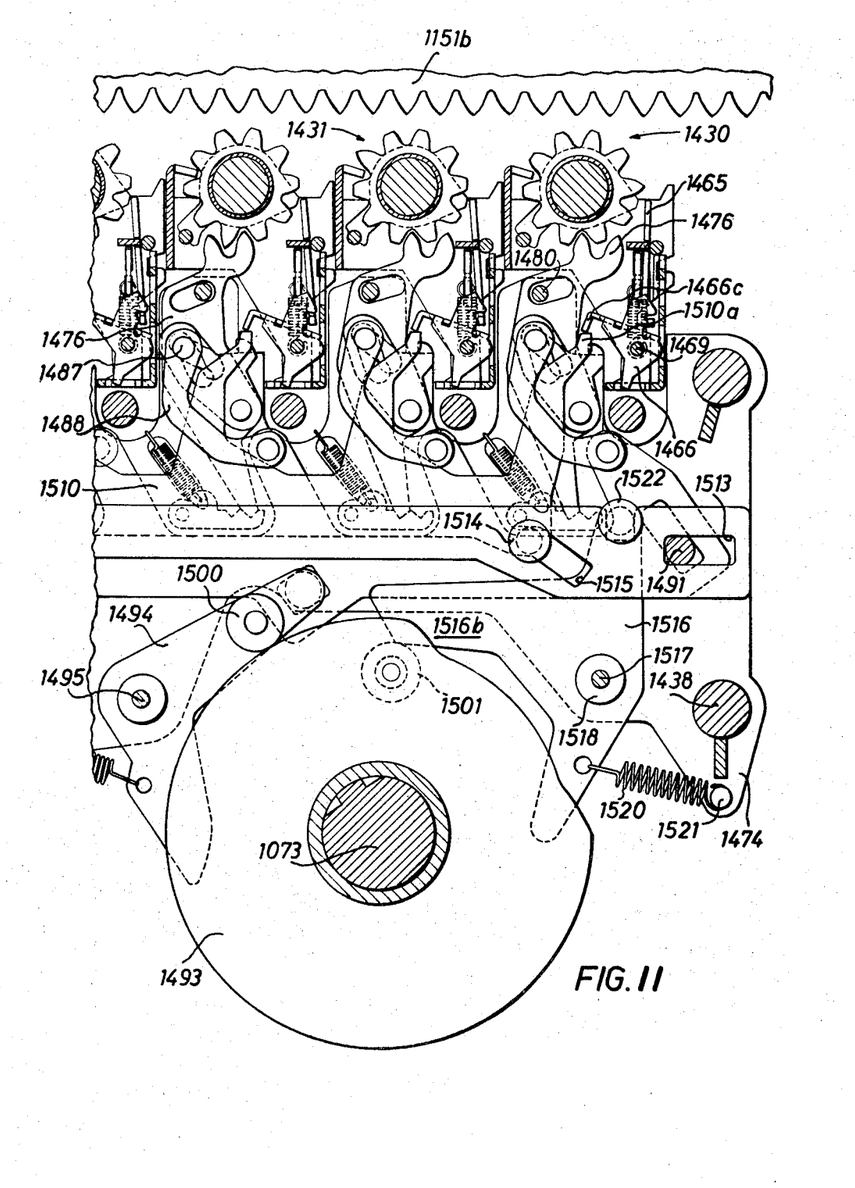
FIGURE 11 is a view similar to FIGURES 7–10 and discloses the carry mechanism at the end of a cycle of operation of the cash register during which the carry indicating means shown in FIGURES 4 and 5 are being reset to a normal condition.

Assuming that during the engagement of the accumulator groups 1430 and 1431 with the amount differential assemblies a carry condition is established in the next lowest order from the orders illustrated in FIG. 9, the carry indicating yokes 1466 in the illustrated order of the accumulator groups 1430 and 1431 are pivoted in a counterclockwise direction about the shaft 1469 so that the depending lip 1466c is disposed immediately above the projection 1477a on the carry detecting levers 1477 associated with these two groups (FIG. 10). The shafts 1439 in the accumulator groups 1430 and 1431 are also lowered to their normal positions shown in FIG. 10. During the period between 276° and 342° of rotation of the main shaft 1073, the clockwise rotation of the cam 1493 moves the roller 1501 out of engagement with the lower arm 1494a on the cam follower lever 1494, and the roller 1500 engages the periphery of the cam 1493 to pivot the lever 1494 in a clockwise direction about the shaft 1495 to the position shown in FIG. 10.

When the lever 1494 is pivoted in a counterclockwise direction about the shaft 1495, the carry actuating slide 1489 is moved upwardly to force the plurality of links 1488 and the cam follower pins 1487 carried thereon upwardly. This upwardly directed movement of the cam follower pins 1487 first tends to pivot the carry detecting levers 1477 in a counterclockwise direction about the pins 1478 so that all of the relative movement between the pairs of the levers 1476 and 1477 is taken up by movement of the detecting levers 1477. However, in the accumulator groups 1430 and 1431 in which a carry condition exists, the projection 1477a on the two carry detecting levers 1477 engage the lips 1466a on the set carry indicating yoke 1466, and counterclockwise movement of the levers 1477 is arrested. Thus, the continuing upward movement of the cam follower pins 1487 results in a clockwise movement of the carry actuating levers 1476 about the pivot pins 1478. The notched upper ends of the levers 1476 each engages a tooth on one of the accumulator gears 1451 and advances these gears a single step in a counterclockwise direction about the accumulator shafts 1439 to enter a carry of an incremental value. This carry operation is progressively performed in denominationally ascending order in the interval between 276° and 342° of rotation of the main shaft 1073 so that the carry in one denominational order is completed before the initiation of the carry operation in the next highest denominational order. In this manner, a carry-on-carry operation can be satisfactorily completed.

In the interval between 306° and 346° of rotation of the main shaft 1073, the roller 1501 is moved into engagement with the arm 1516b on the cam follower lever 1516 (FIG. 11) and pivots this lever in a clockwise direction about the shaft 1517. This shifts the actuating slide 1512 to the right and is effective through the inclined slots 1515 and the pins 1514 carried on the resetting slide 1510 to move this slide upwardly. During this movement, the upper ends of the projecting arms 1510a bear against the lower edges of the lips 1466c on the carry indicating yokes 1466 in those orders in which the indicating yokes 1466 have been set. Thus, the upward movement of the resetting slide 1510 pivots the set carry indicating yokes 1466 in a clockwise direction about the shafts 1469 to return all of the carry indicating yokes in this order to a normal position. As the cam 1493 returns to its normal position, the roller 1501 moves out of engagement with the arm 1516b on the cam follower lever 1516 so that the tension spring 1520 restores the lever 1516 to its normal position. In so moving, the lever 1516 moves the actuating slide 1512 to the left and lowers the resetting slide 1510 to its normal position.

We claim:
1. In an accounting machine, an accumulator including a plurality of movable accumulator elements each representing a different order digit; differential means for actuating said accumulator elements; and carry means for actuating said accumulator elements, said carry means including a carry indicating means actuated by the accumulator element in one order for indicating the need for a carry into the next highest order, a pair of differentially movable levers, cyclically operable drive means coupled to the pair of levers, one of said levers being connected to the accumulator element in said next highest order during a first part of the cycle of the drive means, means controlled by said carry indicating means for selectively locking the other differentially movable lever against movement during said first part of the cycle of the drive means so that actuation of the pairs of levers by the drive means results in movement of said one lever in one direction to provide a carry into the accumulator, and means for resetting the pair of levers including means engageable with said other lever during a second part of the cycle of the drive means to lock said other lever against movement so that actuation of the pair of levers by the drive means during second part of the cycle results in movement of said one lever in a direction opposite to said one direction.

2. In an accounting machine, an accumulator shaft, a plurality of accumulator wheels rotably mounted on said shaft, a plurality of carry actuator means each including a pair of differential levers one of which engages one of said accumulator wheels, differential means for moving said wheels to digit representing position, means for moving said shaft to move said accumulator wheels out of engagement with said carry actuating means and into a driving relation with said differential means, carry indicating means movable with said shaft and operated by the accumulator wheels to a carry position for indicating the need for a carry operation, means for moving said shaft to move said wheels out of a driving relations with said differential means and into engagement with said carry actuating means and to move the carry indicating means into a position adjacent the carry actuating means, and means controlled by said carry indicating means when the carry indicating means is in a carry position and is positioned adjacent the carry actuating means for locking one of the levers to control said carry actuating means to move the accumulator wheels in any of the orders in which a carry is indicated by said carry indicating means.

3. In an accounting machine, a main frame, a totalizer frame movably mounted on said main frame, a totalizer shaft carrying a plurality of spaced accumulator elements carried on said totalizer frame, means for moving said totalizer frame in one direction from an intermediate position to a first position and in a second direction from said intermediate position to a second position, differential elements engaged with said accumulator elements when said totalizer frame is in said first position for moving said accumulator elements to digit representing positions, carry indicating means carried on said totalizer frame and operated by said accumulator elements when said totalizer frame is in said first position, carry actuating means carried on said main frame and each including a pair of differentially movable elements one of which engages an accumulator element when said totalizer frame is in said second position, and control means mounted on said main frame for actuating the differentially movable elements, one of said differentially movable elements being held against movement by said carry indicating means when said totalizer frame is in said second position for rendering said carry actuating means selectively effective to move said accumulator elements.

4. In an accounting machine, differential means, a plurality of totalizers each independently operable into a coupled relation with the differential means, selecting means for selecting different ones or combinations of the totalizers for coupling with the differential means, carry means for each of the totalizers operable to effect carries between successive orders in each of the totalizers, each of the carry means having a normal state and being operated to an actuated state when a carry operation is performed, reset means for restoring a carry means from an actuated state to a normal state, and means for controlling the reset means to render the reset means effective to restore only the carry means associated with a totalizer that has been selected by the selecting means for coupling with the differential means.

5. A transfer mechanism for a totalizer set by a settable means comprising a rotatable totalizer element, a transfer indicating element movable between a normal position and a transfer position indicating the need for a transfer operation, transfer actuating means including a pair of differentially movable elements, a first one of said differentially movable elements having a latch portion and a second one of the differentially movable elements being adapted to be coupled to the totalizer element, means for moving the totalizer element and the transfer indicating element to a first position in which the totalizer element is coupled with the settable means to permit the totalizer element to be set and to permit the selective operation of the transfer indicating means and to a second position in which the totalizer element is coupled with the first differentially movable element and the transfer indicating element controls the latching of the latch portion of the second differentially movable element only when the transfer indicating element is in its transfer position, and drive means coupled to the two differentially movable elements and operable to actuate said first differentially movable element to transfer an increment of value to the totalizer element only when the second differentially movable element is latched against movement under the control of the transfer indicating element in its transfer position.

References Cited

UNITED STATES PATENTS

| | | | |
|---|---|---|---|
| 2,158,142 | 5/1939 | Muller | 235—137 |
| 2,503,865 | 4/1950 | Christian | 101—93 |
| 2,826,366 | 3/1958 | Capellaro | 235—137 |
| 2,917,235 | 12/1959 | Hecht | 235—137 |
| 3,102,688 | 9/1963 | Gang | 235—137 |

STEPHEN J. TOMSKY, *Primary Examiner.*